US006036354A

United States Patent [19]

Bandy

[11] Patent Number: 6,036,354

[45] Date of Patent: Mar. 14, 2000

[54] METHOD AND APPARATUS FOR PRODUCT ENRICHMENT

[76] Inventor: Mark S. Bandy, 1608 36th Ave. South, Fargo, N. Dak. 58104

[21] Appl. No.: 09/104,503

[22] Filed: Jun. 25, 1998

[51] Int. Cl.$^{7}$ .............................. B01F 15/02; A21C 1/00

[52] U.S. Cl. .................. 366/76.6; 366/152.1; 366/160.1

[58] Field of Search ................................ 366/76.1, 76.2, 366/76.3, 76.6, 76.93, 77, 151.1, 152.1, 155.1, 154.1, 160.1, 167.1, 174.1, 175.2, 182.1, 182.3, 182.4, 131, 132, 134, 336

[56] References Cited

U.S. PATENT DOCUMENTS

| | | | |
|---|---|---|---|
| 1,790,347 | 1/1931 | Hawkins | 366/76.3 |
| 3,164,107 | 1/1965 | Oakes et al. | 366/77 |
| 4,111,864 | 9/1978 | Woo | 521/117 |
| 4,171,224 | 10/1979 | Verhille et al. | 366/131 |
| 4,201,867 | 5/1980 | Gasper | 366/160.1 |
| 4,430,054 | 2/1984 | Furuya | 366/137 |
| 4,569,756 | 2/1986 | Klein | 366/336 |
| 4,621,927 | 11/1986 | Hiroi | 366/152.1 |
| 4,964,732 | 10/1990 | Cadeo et al. | 366/152.1 |
| 5,192,130 | 3/1993 | Endo et al. | 366/162.1 |
| 5,372,421 | 12/1994 | Pardikes | 366/160.2 |
| 5,458,415 | 10/1995 | Poilane | 366/160.1 |
| 5,634,715 | 6/1997 | Stehr et al. | 366/160.1 |

*Primary Examiner*—Tony G. Soohoo
*Attorney, Agent, or Firm*—Zarley, McKee, Thomte, Voorhees & Sease; Dennis L. Thomte

[57] ABSTRACT

A method for enriching a processed agricultural commodity includes the initial step of preparing a liquid enrichment solution. The solution is continuously mixed in a measured flow of supply water and thence the enriched supply water is mixed with a measured amount of flour to produce a dough which is uniformly enriched. The enrichment injection system of the present invention includes a tank for the preparation of the enrichment solution with a delivery pipe extending from a drain therein to delivery the solution to a fluid mixer. A water supply line provides water to the fluid mixer, and flow meters are interposed on both the delivery pipe and the water supply line. A flow control valve is interposed in the delivery pipe and connected to an electronic controller to selectively adjust the flow of enrichment solution to the fluid mixer to achieve the desired mixture of water and enrichment solution.

19 Claims, 3 Drawing Sheets

METHOD AND APPARATUS FOR PRODUCT ENRICHMENT

TECHNICAL FIELD

The present invention relates generally to enrichment of processed agricultural commodities, and more particularly to an improved method and apparatus for product enrichment which provides uniform dispersion of an enriched solution throughout a commodity.

BACKGROUND OF THE INVENTION

Enrichment is defined as the addition of essential vitamins and minerals to processed agricultural commodities, such as flour, that is intended for human consumption. The final concentration of the vitamins and minerals in the food product is regulated and monitored by the U.S. Food and Drug Administration (FDA). Failure to meet the requirements established by the FDA can result in an expensive recall of the final product after it has been placed on the market.

Currently, product enrichment occurs at milling facilities by augering powder form of the vitamins and minerals into a stream of flour. This method of enrichment has a number of inherent problems, resulting in a non-uniform disbursement of the vitamins and minerals throughout the product. Because of the great variability and inaccuracy of the prior art enrichment process, the enriched food products are frequently outside FDA specifications, and therefore subject to expensive product recall.

SUMMARY OF THE INVENTION

It is therefore a general object of the present invention to provide an improved method and apparatus for enriching processed agricultural commodities.

Another object is to provide an improved method and apparatus for the enrichment of food products which uniformly and accurately disperses vitamins and minerals throughout the food product.

Yet a further object of the present invention is to provide an enrichment injection system which is simple to operate and economical to manufacture.

These and other objects of the present invention will be apparent to those skilled in the art.

The method for enriching a processed agricultural commodity of the present invention includes the initial step of preparing a liquid enrichment solution. The solution is continuously mixed in a measured flow of supply water and thence the enriched supply water is mixed with a measured amount of flour to produce a dough which is uniformly enriched. The enrichment injection system of the present invention includes a tank for the preparation of the enrichment solution with a delivery pipe extending from a drain therein to deliver the solution to a fluid mixer. A water supply line provides water to the fluid mixer, and flow meters are interposed on both the delivery pipe and the water supply line. A flow control valve is interposed in the delivery pipe and connected to an electronic controller to selectively adjust the flow of enrichment solution to the fluid mixer to achieve the desired mixture of water and enrichment solution.

DESCRIPTION OF THE PREFERRED EMBODIMENT

Figure 1:
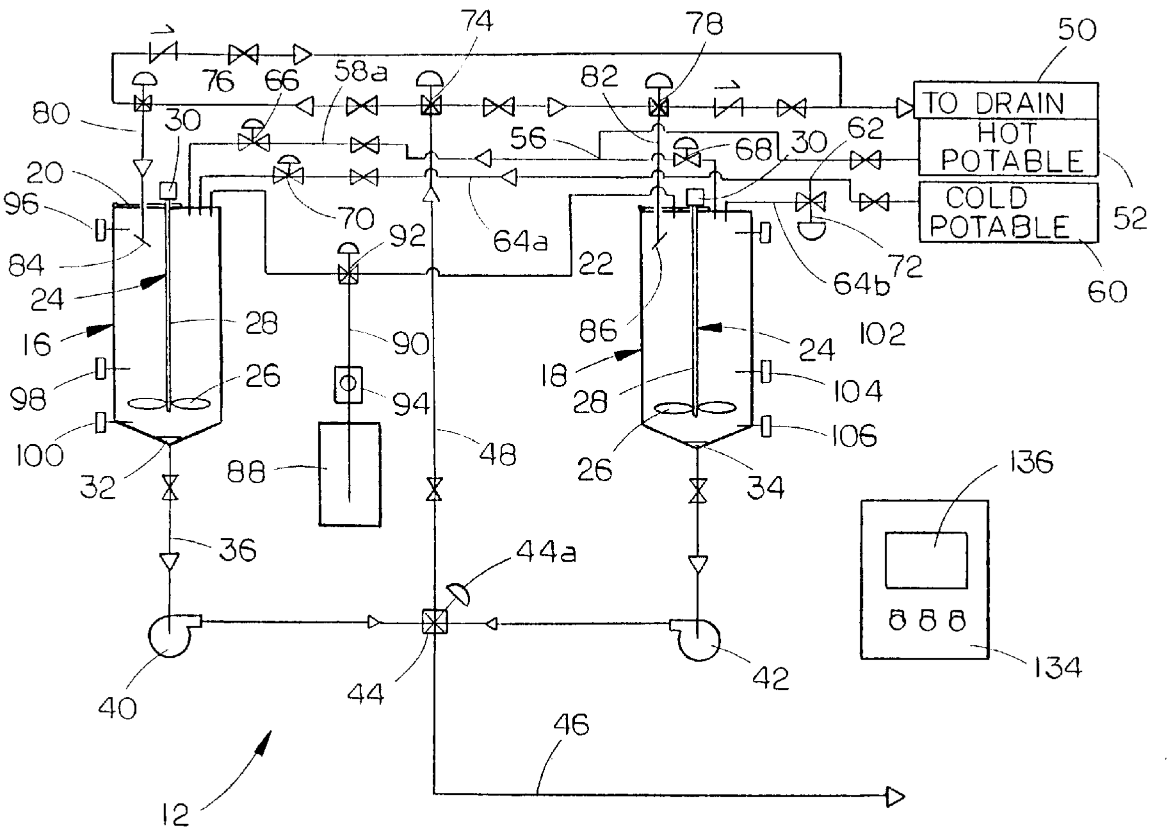
FIG. 1 is a schematic drawing of the solution processing apparatus of the present invention.
Figure 2:
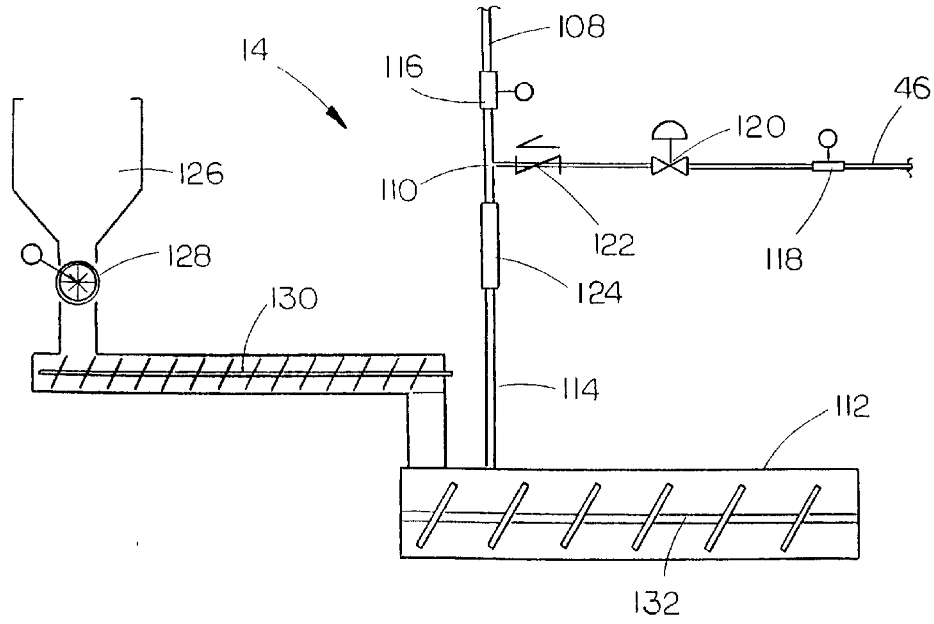
FIG. 2 is a schematic drawing of the mixing apparatus of the present invention.

Referring now to the drawings, in which similar or corresponding parts are identified with the same reference numeral, and more particularly to FIGS. 1 and 2, the enrichment injection system 10 of the present invention includes a solution processing apparatus designated generally at 12, which produces enrichment solution for a mixing apparatus designated generally at 14.

Referring specifically to FIG. 1, processing apparatus 12 includes a pair of tanks 16 and 18, each having a lid 20 and 22 respectively, permitting access to the interior of the tanks. Tanks 16 and 18 each include an agitator 24 with a blade 26 mounted on a shaft 28 which is powered by a motor 30, the blade disposed at the lower end of tanks 16 and 18. Tanks 16 and 18 each include a drain 32 and 34 respectively, connected to drain pipes 36 and 38 respectively. Drain pipes 36 and 38 are each connected to a centrifugal pump 40 and 42 respectively, the outlets of pumps 40 and 42 each connected via a conduit to a four-way valve 44 having an electronic actuator 44*a*. Four-way valve 44 is operable to direct fluid from pumps 40 and 42 in opposite directions, either to delivery tube 46, or to return tube 48. Delivery tube 46 directs fluid to the mixing apparatus 14, as described in more detail hereinbelow. Return tube 48 returns fluid to its associated tanks 16 or 18, or to a system drain 50.

A hot potable water supply is designated generally at 52, and delivers hot water through pipe 54 to a tee 56 whereupon the hot water supply is divided and directed through supply tubes 58*a* and 58*b* to each of tanks 16 and 18 respectively. Similarly, cold potable water supply 60 supplies cold water to a tee 62 and is divided to pass through cold water supply tubes 64*a* and 64*b* to tanks 16 and 18 respectively. Supply tubes 58*a*, 58*b*, 64*a* and 64*b* each include a valve 66, 68, 70 and 72 respectively with electronic actuators, to permit selective dispensing of hot and cold water to tanks 16 and 18.

Return tube 48 extends from four-way valve 44 to a three-way valve 74 having an electronic actuator. Three-way valve 74 is operable to direct fluid towards a second three-way valve 76 or a third three-way valve 78 (each also electronically activated). Second three-way valve 76 is operable to direct fluid either to tank 16, or to system drain 50. Similarly, third three-way valve 78 is operable to direct fluid to either tank 18 or system drain 50.

Pipe 80 and 82 extend from three-way valves 76 and 78, respectively, to tanks 16 and 18 respectively, and have a spray ball 84 and 86 respectively at the outlet end within tanks 16 and 18. Spray balls 84 and 86 disperse the fluid within tanks 16 and 18 to rinse and flush the interiors thereof.

A third tank 88 contains a liquid cleaning agent and has a tube 90 extending therefrom to a three-way valve 92 with electronic actuator. Three-way valve 92 divides fluid from third tank 88 and is operable to direct the fluid to a selected tank 16 or 18. A peristaltic pump is interposed in tube 90 to pump cleaning agent from tank 88 to the desired tank 16 or 18.

Three sensors 96, 98 and 100 are installed on tank 16, to determine the level of fluid within the tank. Sensor 96 is located at the upper end of tank 16, sensor 100 is located at the lower end of tank 16, and sensor 98 is spaced slightly above lower sensor 100. The purpose of the sensors will be described in more detail hereinbelow. Upper sensor 102, intermediate sensor 104, and lower sensor 106 are provided in a similar fashion on tank 18.

Referring now to FIG. 2, mixing apparatus 14 is shown in schematic detail. Delivery tube 46, from processing apparatus 12, connects with supply pipe 108, at a tee 110, the combination of fluids being transported to a dough mixer 112 by conduit 114.

An electronic fluid flow meter 116 is interposed in supply pipe 108 upstream of tee 110, and a second electronic fluid flow meter 118 is interposed in delivery tube 46 upstream of tee 110. An electronic flow control valve 120 is interposed between flow meter 118 and tee 110 to permit selective control of the flow of enrichment solution from delivery pipe 46 to water from supply pipe 108. A check valve 122 prevents back flow of fluid into delivery pipe 46. An in line static mixer 124 is provided to thoroughly mix water from supply pipe 108 and enrichment solution from delivery pipe 46 before the mixture travels to dough mixer 112.

A hopper 126 contains a supply of flour therein for the manufacture of a processed agricultural commodity. An electronically controlled rotary feeder 128 deposits measured amounts of flour into auger 130. Auger 130 conveys the measured flour at a constant rate to one end of dough mixer 112 and deposits the flour into a mixing auger 132. Water with enriched solution uniformly mixed therein enters the dough mixer 112 to combine with flour in the mixing auger 132. Mixing auger 132 then conveys the dough out of the dough mixer 112.

Figure 4:
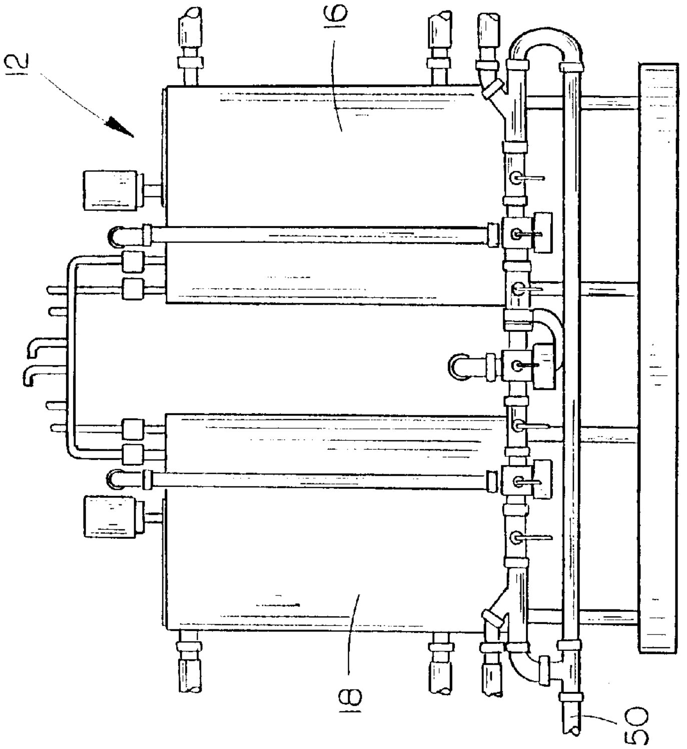
FIG. 4 is a rearward elevational view of the processing apparatus.
Figure 3:
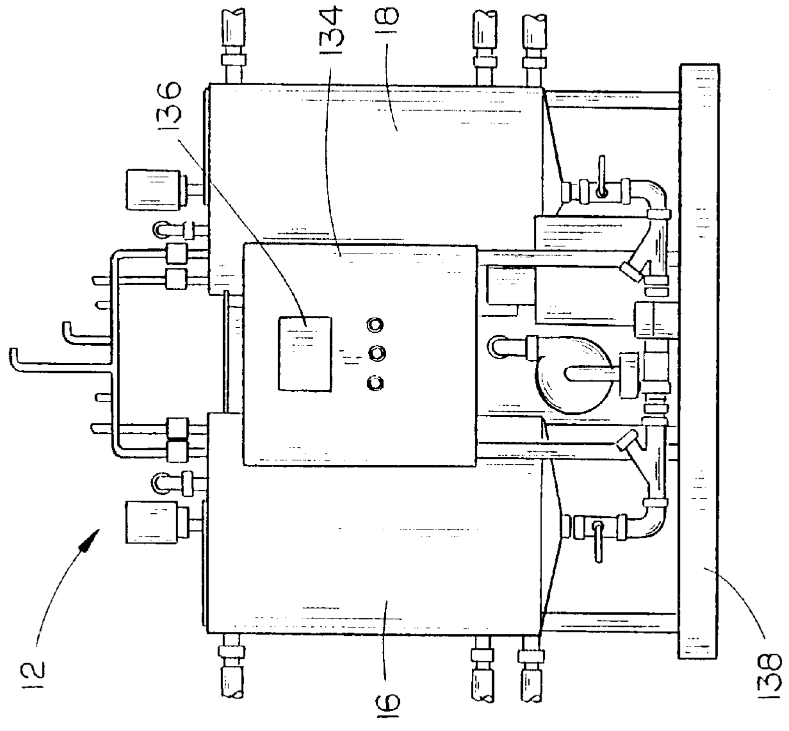
FIG. 3 is a front elevational view of the processing apparatus.

All of the electronically actuated valves, sensors, agitators, pumps, flow meters, feeders, and augers, are electronically connected to an electrical controller 134, shown in FIG. 1. Controller 134 includes an interface 136 permitting the programming of the controller for the operation of all the components. FIG. 3 shows one arrangement of a processing apparatus 12 with the controller 134 mounted on a base 138 with the interface 136 at easily accessible height for an operator. As shown in FIGS. 3 and 4, tanks 16 and 18 are supported on base 138 and deliver enriched solution via delivery tube 46 to the mixing apparatus (not shown).

The enrichment solution injection system of the present invention accurately delivers liquefied vitamins and minerals to flour ensuring that the final product will meet FDA enrichment specifications, and thereby eliminate product recall. Because the method and apparatus are simple and economical to use, processors may accurately enrich their products "in house" and avoid inaccurate enrichment provided by supplier of dry components.

Referring once again to FIG. 1, the initial step for enriching a processed agricultural commodity is the preparation of an enrichment solution in tanks 16 and 18. Initially, tanks 16 and 18 are filled with a predetermined amount of premix water, supplied from hot water supply 52 and cold water supply 60. The desired vitamins and minerals are then added to tanks 16 and 18 through access lids 20 and 22 so as to liquify the vitamins and minerals. Agitators 30 are operated to mix the enrichment solution within tanks 16 and 18, and maintain the vitamins and minerals suspended in the solution. Once the enrichment solution is prepared for the desired end product, solution is drained from tank 16 and pumped by centrifugal pump 40 through four-way valve 44 to delivery tube 46.

Referring again to FIG. 2, the enrichment solution passes through flow meter 118 and flow control valve 120 to mix with water from supply pipe 108 in static mixer 124. Flow control valve 120 continuously measures the flow rates of water through flow meter 116, and enrichment solution through flow meter 118 to continuously maintain the appropriate proportions of enrichment solution to water. Once the enrichment solution and water has mixed in static mixer 124, it continues through conduit 114 into dough mixer 112. Simultaneously, flour from hopper 126 is measured by rotary feeder 128 and conveyed by auger 130 to dough mixer 112 where it is mixed with the enriched water supply in mixing auger 132 to produce the desired dough being uniformly enriched throughout.

While enrichment solution is being supplied by first tank 16, a second batch of enrichment solution is prepared in tank 18, in the same fashion as the enrichment solution in tank 16. Lower sensor 100 in tank 16 will detect when the first tank is depleted of the enrichment solution, at which time controller 134 will operate four-way valve 44 and pump 42 to initiate flow of enrichment solution from tank 18. In this way, enrichment solution is continuously supplied to delivery tube 46 without interruption.

As tank 18 supplies enrichment solution to delivery pipe 46, controller 134 will automatically drain, flush, clean and sanitize first tank 16 to allow preparation of a new batch of enrichment solution. Initially, solution remaining within tank 16 is drained via pump 40 through four-way valve 44 to return tube 48 and thence to the system drain. Tank 16 is then flushed with water from hot and/or cold water supplies 52 and 60, intermediate sensor 98 and upper sensor 96 determining the level of rinse water within tank 16. The rinse water is then also drained through the system drain 50. Controller 134 then operates pump 94 to deliver cleaning agent from third tank 88 into tank 16. Again, the cleaning agent is drained from tank 16 and expelled from the processing apparatus through system drain 50. Water is then again used to fill and flush tank 16, and is preferably recirculated through pipe 80 and spray ball 84 to thoroughly flush like entire tank 16. A new batch of enrichment solution is then prepared within tank 16.

Figure 5:
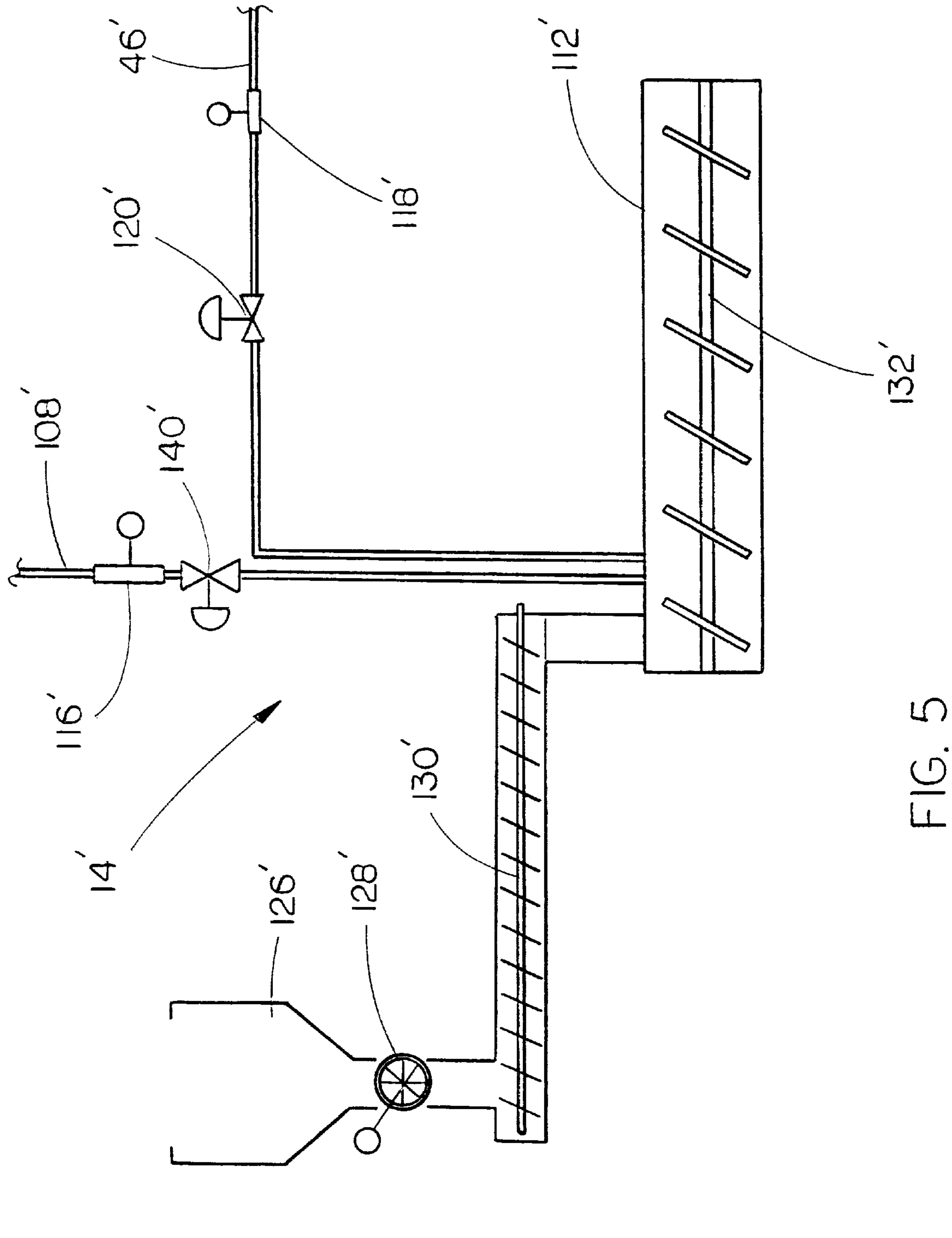
FIG. 5 is a schematic drawing of a second embodiment of the mixing, apparatus of the present invention.

A second embodiment of the mixing apparatus is designated generally at 14' in FIG. 5. In this second embodiment of the mixing apparatus 14', the delivery tube 46', carrying the enrichment solution, is injected directly into dough mixer 112' separately from the water supply pipe 108'. Delivery tube 46' still includes flow meter 118' and flow control valve 120', to detect and control the flow of the enrichment solution to the dough mixer 112'. Similarly, motor supply pipe 108' includes flow meter 116' and a flow control valve 140' for detecting and controlling the flow of water supplied to dough mixer 112'. Hopper 126' supplies flour through an electronically controlled rotary feeder 128' to auger 130' which deposits the flour into mixing auger 132' of dough mixer 112'. As with the first embodiment of the invention, all of the electronically actuated flow meters, flow control valves, feeders, and augers, are electronically connected to the electrical controller 134, shown in FIG. 1. Interface 136 permits the programming of the controller for the operation of all of these components.

In operation, the mixing apparatus 14' utilizes controller 134 to determine the feed rate of dry product from hopper 126' through feeder 128'. It processes this information with information as to the moisture content of the dry product within hopper 126', so as to adjust the flow of water from supply pipe 108', by adjusting valve 140'. Thus, the moisture content of the dough being mixed within dough mixer 112' is adjusted independently of the addition of enrichment solution delivered by delivery tube 46'.

Whereas the invention has been shown and described in connection with the preferred embodiment thereof, many modifications, substitutions and additions may be made which are within the intended broad scope of the appended claims.

I claim:

1. An enrichment injection system, comprising:

a first tank for preparing an enrichment solution;

a delivery pipe extending from a drain in the first tank for delivering solution to a fluid a fluid mixer connected to an outlet end of the delivery pipe and an outlet end of a water supply line, for mixing a measured amount of water from the water supply line with solution from the delivery pipe;

an electronic delivery pipe fluid flow meter interposed in the delivery pipe to measure the flow of enrichment solution therethrough;

an electronic control valve interposed in the delivery pipe between the delivery pipe fluid flow meter and the fluid mixer for selectively adjusting the flow of enrichment solution through the delivery pipe;

a conduit extending from the fluid mixer to a dough mixer; and a flour supply apparatus connected to the dough mixer for supplying a measured amount of flour to the dough mixer;

said dough mixer operable to mix measured amounts of flour from the flour supply apparatus and measured amounts of water containing enrichment solution from the conduit, to create an enriched dough product.

2. The system of claim 1, further comprising:

a first electronic fluid flow meter interposed in the water supply line to measure the flow of water therethrough; and an electronic controller electrically connected to the first and second flow meters, the control valve, and the flour supply apparatus, operable to detect the flow of water and enrichment solution and control the flow of the enrichment solution to produce a mixed water supply with enrichment solution mixed therein in a predetermined concentration, and to control the amount of flour added to the dough mixer with the enriched water supply to produce an enriched dough product having a predetermined concentration of enriched solution uniformly therethrough.

3. The system of claim 2, wherein the fluid mixer is an in line static mixer.

4. The system of claim 2, further comprising a potable water supply and a pipe extending therefrom to the first tank to supply water thereto, and further comprising an electrically operated control valve interposed in the water supply pipe and electrically connected to the controller for selective dispensing of potable water into the first tank.

5. The system of claim 4, further comprising a second tank for holding a prepared enrichment solution, the second tank having a drain in the lower end thereof and drain pipe extending from the second tank drain to an electronically actuated valve interposed in the delivery pipe, said first tank including a drain and drain pipe extending therefrom to the electronically actuated valve in the delivery pipe;

said valve in the delivery pipe electrically connected to the controller for selective operation of the valve to direct fluid from either the first tank or the second tank to the delivery pipe and fluid mixer.

6. The system of claim 2, further comprising a second tank for holding a prepared enrichment solution, the second tank having a drain in the lower end thereof and drain pipe extending from the second tank drain to an electronically actuated valve interposed in the delivery pipe, said first tank including a drain and drain pipe extending therefrom to the electronically actuated valve in the delivery pipe;

said valve in the delivery pipe electrically connected to the controller for selective operation of the valve to direct fluid from either the first tank or the second tank to the delivery pipe and fluid mixer.

7. An enrichment injection system, comprising:

a tank for preparing an enrichment solution;

a delivery pipe extending from the tank to a dough mixer;

a flow meter and flow control valve interposed in the delivery pipe and electrically connected to an electronic controller;

a flour supply apparatus connected to the dough mixer and having a feeder valve and moisture content sensor, the valve and sensor electrically connected to the electronic controller;

a water supply pipe extending from a water supply to the dough mixer;

a flow meter and flow control valve interposed in the water supply pipe and electrically connected to the electronic controller;

said electronic controller including a processor for processing data from the flour supply apparatus, flow meters and flow control valves, and controlling the feeder valve and flow control valves to supply predetermined amounts of flour, water and enrichment solution to the dough mixer; and said dough mixer operable to mix the flour, water and enrichment solution to create a uniformly enriched dough product.

8. An enrichment injection system, comprising:

a first tank for preparing an enrichment solution;

a delivery pipe extending from a drain in the first tank for delivering solution to a mixer;

a fluid mixer connected to an outlet end of the delivery pipe and an outlet end of a water supply line, for mixing water from the water supply line with solution from the delivery pipe;

a conduit extending from the fluid mixer to a dough mixer;

a flour supply apparatus connected to the dough mixer, for supplying a measured amount of flour to the dough mixer, said dough mixer operable to mix measured amounts of flour from the flour supply apparatus and measured amounts of water containing enrichment solution from the conduit;

a first electronic fluid flow meter interposed in the water supply line to measure the flow of water therethrough;

a second electronic fluid flow meter interposed in the delivery pipe to measure the flow of enrichment solution therethrough;

an electronic control valve interposed in the delivery pipe between the second flow meter and the fluid mixer for selectively adjusting the flow of enrichment solution through the delivery pipe;

an electronic controller electrically connected to the first and second flow meters, the control valve, and the flour supply apparatus, operable to detect the flow of water and enrichment solution and control the flow of the enrichment solution to produce a mixed water supply with enrichment solution mixed therein in a predetermined concentration, and to control the amount of flour added to the dough mixer with the enriched water supply to produce an enriched dough product having a predetermined concentration of enriched solution uniformly therethrough;

said fluid mixer being an in-line static mixer; and said first tank further including an electrically operated agitator for mixing the contents of the first tank, the agitator electrically connected to the controller for selective operation thereof.

9. The system of claim 8, further comprising a potable water supply and a pipe extending therefrom to the first tank to supply water thereto, and further comprising an electrically operated control valve interposed in the water supply pipe and electrically connected to the controller for selective dispensing of potable water into the first tank.

10. The system of claim 9, further comprising a second tank for holding a prepared enrichment solution, the second tank having a drain in the lower end thereof and drain pipe extending from the second tank drain to an electronically actuated valve interposed in the delivery pipe, said first tank including a drain and drain pipe extending therefrom to the electronically actuated valve in the delivery pipe;

said valve in the delivery pipe electrically connected to the controller for selective operation of the valve to direct fluid from either the first tank or the second tank to the delivery pipe and fluid mixer.

11. The system of claim 10, further comprising a return tube extending from this delivery pipe valve to an electronically actuated return tube valve operable to direct fluid to either the first tank or second tank;

said return tube valve electrically connected to the controller for selective operation thereof; and a first pump interposed in the drain pipe between the first tank and delivery pipe valve to pump selectively pump fluid to the delivery pipe valve;

a second pump interposed in the second tank drain pipe operable to pump fluid towards the delivery pipe valve;

said first and second pumps electrically connected to the controller for selective operation thereof.

12. The system of claim 11, further comprising a system drain fluidly connected to first and second electrically actuated valves, the first valve interposed in the fluid line between the return tube valve and the first tank, and the second operable valve interposed in the fluid line between the return tube valve and the second tank, a first and second operable valves connected to the controller for selective operation to selectively direct fluid to the system drain or to the associated tank.

13. The system of claim 12, further comprising a third tank having a cleaning agent therein connected via a tube to an electrically actuated valve, the valve operable to direct fluid to either the first or second tanks, said third tank valve electrically connected to the controller for selective operation thereof; and a pump interposed in the tube between the third tank and its associated valve for pumping fluid to either the first or second tank, said pump electrically connected to the controller for selective operation thereof.

14. An enrichment injection system, comprising:

a first tank for preparing an enrichment solution;

a delivery pipe extending from a drain in the first tank for delivering solution to a mixer;

a fluid mixer connected to an outlet end of the delivery pipe and an outlet end of a water supply line, for mixing water from the water supply line with solution from the delivery pipe;

a conduit extending from the fluid mixer to a dough mixer;

a flour supply apparatus connected to the dough mixer, for supplying a measured amount of flour to the dough mixer, said dough mixer operable to mix measured amounts of flour from the flour supply apparatus and measured amounts of water containing enrichment solution from the conduit;

a first electronic fluid flow meter interposed in the water supply line to measure the flow of water therethrough;

a second electronic fluid flow meter interposed in the delivery pipe to measure the flow of enrichment solution therethrough;

an electronic control valve interposed in the delivery pipe between the second flow meter and the fluid mixer for selectively adjusting the flow of enrichment solution throughout the delivery pipe; and an electronic controller electrically connected to the first and second flow meters, the control valve, and the flour supply apparatus, operable to detect the flow of water and enrichment solution and control the flow of the enrichment solution to produce a mixed water supply with enrichment solution mixed therein in a predetermined concentration, and to control the amount of flour added to the dough mixer with the enriched water supply to produce an enriched dough product having a predetermined concentration of enriched solution uniformly therethrough;

a potable water supply and a pipe extending therefrom to the first tank to supply water thereto;

an electrically operated control valve interposed in the water supply pipe and electrically connected to the controller for selective dispensing of potable water into the first tank;

a second tank for holding a prepared enrichment solution, the second tank having a drain in the lower end thereof and drain pipe extending from the second tank drain to an electronically actuated valve interposed in the delivery pipe, said first tank including a drain and drain pipe extending therefrom to the electronically actuated valve in the delivery pipe;

said valve in the delivery pipe electrically connected to the controller for selective operation of the valve to direct fluid from either the first tank or the second tank to the delivery pipe and fluid mixer;

a return tube extending from the delivery pipe valve to an electronically actuated return tube valve operable to direct fluid to either the first tank or second tank;

said return tube valve electrically connected to the controller for selective operation thereof;

a first pump interposed in the drain pipe between the first tank and delivery pipe valve to pump selectively pump fluid to the delivery pipe valve; and a second pump interposed in the second tank drain pipe operable to pump fluid toward the delivery pipe valve;

said first and second pumps electrically connected to the controller for selective operation thereof.

15. The system of claim 14, further comprising a system drain fluidly connected to first and second electrically actuated valves, the first valve interposed in the fluid line between the return tube valve and the first tank, and the second operable vale interposed in the fluid line between the return tube valve and the second tank, a first and second operable valves connected to the controller for selective operation to selectively direct fluid to the system drain or to the associated tank.

16. The system of claim 15, further comprising a third tank having a cleaning agent therein connected via a tube to an electrically actuated valve, the valve operable to direct fluid to either the first or second tanks, said third tank valve electrically connected to the controller for selective operation thereof; and a pump interposed in the tube between the third tank and its associated valve for pumping fluid to either the first or second tank, said pump electrically connected to the controller for selective operation thereof.

17. An enrichment injection system, comprising:

a first tank for preparing an enrichment solution;

a delivery pipe extending from a drain in the first tank for delivering solution to a mixer;

a fluid mixer connected to an outlet end of the delivery pipe and an outlet end of a water supply line, for mixing water from the water supply line with solution from the delivery pipe;

a conduit extending from the fluid mixer to a dough mixer;

a flour supply apparatus connected to the dough mixer, for supplying a measured amount of flour to the dough mixer, said dough mixer operable to mix measured amounts of flour from the flour supply apparatus and measured amounts of water containing enrichment solutions from the conduit;

a first electronic fluid flow meter interposed in the water supply line to measure the flow of water therethrough;

a second electronic fluid flow meter interposed in the delivery pipe to measure the flow of enrichment solution therethrough;

an electronic control valve interposed in the delivery pipe between the second flow meter and the fluid mixer for selectively adjusting the flow of enrichment solution through the delivery pipe; and an electronic controller electrically connected to the first and second flow meters, the control valve, and the flour supply apparatus, operable to detect the flow of water and enrichment solution and control the flow of the enrichment solution to produce a mixed water supply with enrichment solution mixed therein in a predetermined concentration, and to control the amount of flour added to the dough mixer with the enriched water supply to produce an enriched dough product having a predetermined concentration of enriched solution uniformly therethrough;

a second tank for holding a prepared enrichment solution, the second tank having a drain in the lower end thereof and drain pipe extending from the second tank drain to an electronically actuated valve interposed in the delivery pipe, said first tank including a drain and drain pipe extending therefrom to the electronically actuated valve in the delivery pipe;

said valve in the delivery pipe electrically connected to the controller for selective operation of the valve to direct fluid from either the first tank or the second tank to the delivery pipe and fluid mixer;

a return tube extending from the delivery pipe valve to an electronically actuated return tube valve operable to direct fluid to either the first tank or second tank;

said return tube valve electrically connected to the controller for elective operation thereof;

a first pump interposed in the drain pipe between the first tank and delivery pipe valve to selectively pump fluid to the delivery pipe valve; and a second pump interposed in the second tank drain pipe operable to pump fluid towards the delivery pipe valve;

said first and second pumps electrically connected to the controller for selective operation thereof.

18. The system of claim 17, further comprising a system drain fluidly connected to first and second electrically actuated valves, the first valve interposed in the fluid line between the return tube valve and the first tank, and the second operable valve interposed in the fluid line between the return tube valve and the second tank, a first and second operable valves connected to the controller for selective operation to selectively direct fluid to the system drain or to the associated tank.

19. The system of claim 18, further comprising a third tank having a cleaning agent therein connected via a tube to an electrically actuated valve, the valve operable to direct fluid to either the first or second tanks, said third tank valve electrically connected to the controller for selective operation thereof; and a pump interposed in the tube between the third tank and its associated valve for pumping fluid to either the first or second tank, said pump electrically connected to the controller for selective operation thereof.

* * * * *